(12) United States Patent
Skerfe et al.

(10) Patent No.: US 11,753,771 B2
(45) Date of Patent: Sep. 12, 2023

(54) METHOD OF PRODUCING FILLER

(71) Applicant: Stora Enso OYJ, Helsinki (FI)

(72) Inventors: Elina Skerfe, Harplinge (SE); Erik Mattsson, Svärdsjo (SE)

(73) Assignee: Stora Enso OYJ, Helsinki (FI)

( * ) Notice: Subject to any disclaimer, the term of this patent is extended or adjusted under 35 U.S.C. 154(b) by 370 days.

(21) Appl. No.: 15/562,943

(22) PCT Filed: Mar. 31, 2016

(86) PCT No.: PCT/IB2016/051842
§ 371 (c)(1),
(2) Date: Sep. 29, 2017

(87) PCT Pub. No.: WO2016/157122
PCT Pub. Date: Oct. 6, 2016

(65) Prior Publication Data
US 2018/0112360 A1    Apr. 26, 2018

(30) Foreign Application Priority Data
Mar. 31, 2015  (SE) .................................. 1550390-7

(51) Int. Cl.
*D21H 17/67* (2006.01)
*D21H 17/20* (2006.01)
(Continued)

(52) U.S. Cl.
CPC ......... *D21H 17/675* (2013.01); *C01F 11/181* (2013.01); *C09C 1/021* (2013.01);
(Continued)

(58) Field of Classification Search
CPC . C01F 11/181; C01P 2002/80; C01P 2006/60; C09C 1/021; C09C 3/04;
(Continued)

(56) References Cited

U.S. PATENT DOCUMENTS 3,150,926 A * 9/1964 Pope .................... C01F 11/181
                                                  106/157.2
5,143,304 A   9/1992 Schwyter
(Continued)

FOREIGN PATENT DOCUMENTS

CN    1723314 A    1/2006
DE    4135368      7/1993
(Continued)

OTHER PUBLICATIONS

"Aska—innehåll och hardning," Skogsvårdsstyrelsen. Västra Götaland. 2010. Published at http://www.energiaskor.se/pdf-dokument/aska%20till%20skog%20och%20mark/Aska.pdf.
(Continued)

*Primary Examiner* — Shuangyi Abu Ali
(74) *Attorney, Agent, or Firm* — Greer, Burns & Crain, Ltd.

(57) ABSTRACT

The invention provides a method of producing a filler comprising calcium carbonate (PCC), preferably to be used in paper or paper board production or in fibre based composites. The method of the invention comprises the steps of; —providing fly ash generated in paper or paper board production; —fractionating said fly ash in at least one step, whereby a coarser fraction is separated from a finer fraction; —forming a suspension of said coarser fraction; —adding carbon dioxide to said suspension to form precipitated calcium carbonate. The method of the invention avoids problems with high amounts of arsenic and heavy metals in the production of filler comprising PCC, when using ash generated in paper or paper board production as a raw material. It has been shown that harmful elements, such as arsenic and heavy metals, are primarily accumulated in the finer fractions of the fly ash. Thus, by using the coarser
(Continued)

fraction in the step of carbonation, the amount of arsenic and heavy metals in the final product is reduced.

8 Claims, 1 Drawing Sheet

(51) Int. Cl.
    D21H 17/70      (2006.01)
    C01F 11/18      (2006.01)
    D21C 5/02       (2006.01)
    D21J 1/00       (2006.01)
    D21H 17/69      (2006.01)
    C09C 3/04       (2006.01)
    C09C 1/02       (2006.01)

(52) U.S. Cl.
    CPC .................. C09C 3/04 (2013.01); D21C 5/02 (2013.01); D21H 17/20 (2013.01); D21H 17/67 (2013.01); D21H 17/69 (2013.01); D21H 17/70 (2013.01); D21J 1/00 (2013.01); C01P 2002/80 (2013.01); C01P 2006/60 (2013.01); Y02W 30/64 (2015.05)

(58) Field of Classification Search
    CPC .......... D21C 5/02; D21H 17/20; D21H 17/67; D21H 17/675; D21H 17/69; D21H 17/70; D21J 1/00; Y02W 30/648; Y02W 30/64
    See application file for complete search history.

(56) References Cited

U.S. PATENT DOCUMENTS

| | | |
|---|---|---|
| 5,759,258 A | 6/1998 | Sohara et al. |
| 5,846,378 A | 12/1998 | Phipps |
| 6,402,824 B1* | 6/2002 | Freeman ............... B01F 3/1207 106/464 |
| 2013/0164198 A1 | 6/2013 | Karbarz |
| 2014/0306369 A1* | 10/2014 | Smalley .................. C04B 26/04 264/142 |

FOREIGN PATENT DOCUMENTS

| | | |
|---|---|---|
| DE | 19522704 | 1/1997 |
| GB | 2395162 | 5/2004 |
| JP | 2002233851 | 8/2002 |
| JP | 2013204175 | 10/2013 |
| WO | 9632354 | 10/1996 |
| WO | 0048960 A1 | 8/2000 |
| WO | 2004053229 A1 | 6/2004 |
| WO | 2011110744 A2 | 9/2011 |
| WO | 2012175788 A1 | 12/2012 |
| WO | 2014048979 A1 | 4/2014 |

OTHER PUBLICATIONS

Obemberger, Ingwald and Biedermann, Friedrich. "Fractionated Heavy Metal Separation in Biomass Combustion Plants—Possibilities, Technological Approach, Experiences." Published in Proceedings of the International Conference, "Impact of Mineral Impurities in Solid Fuel Combustion." 1997. Kona, HI, Engineering Foundation (ed) NY.

International Search Report for PCT/IB2016/051842, dated Jun. 14, 2016.

Extended European Search Report for EP 16771506.9, dated Aug. 28, 2018.

* cited by examiner

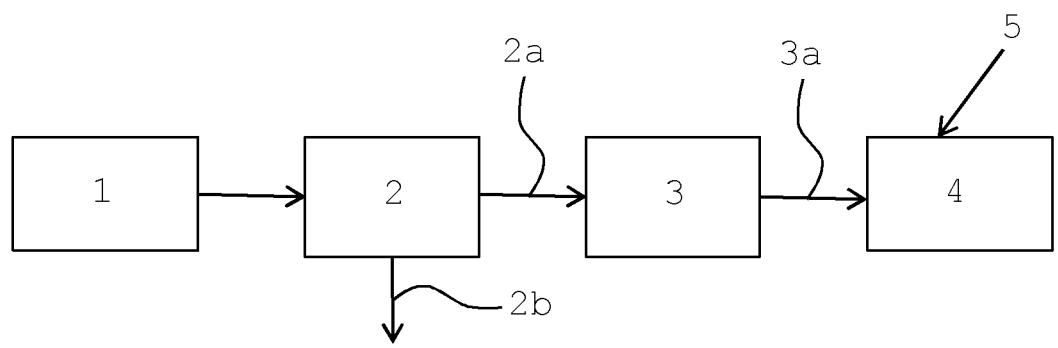

METHOD OF PRODUCING FILLER

This application is a U.S. National Phase under 35 U.S.C. § 371 of International Application No. PCT/IB2016/051842, filed Mar. 31, 2016, which claims priority under 35 U.S.C. §§ 119 and 365 to Swedish Application No. 1550390-7, filed Mar. 31, 2015.

TECHNICAL FIELD

The present document relates a method of producing a filler, preferably to be used in paper, paperboard or composite production.

BACKGROUND

In papermaking production, fillers are added to the furnish in order to improve optical and surface properties of the paper. Increasing the filler content of paper can provide the papermaker with numerous benefits, including savings in the cost of raw materials, improved optical properties and possibilities to optimize the fiber composition in the paper or paperboard.

Typically, clay or different forms of calcium carbonate minerals are used as fillers. Calcium carbonate can for example be in the form of chalk, marble or precipitated calcium carbonate (PCC). In recent years, precipitated calcium carbonate (PCC) has become common. Today, PCC is one of the most prevailing filler used in the production of fine paper.

Precipitated calcium carbonate (PCC) can be produced by calcining limestone (calcium carbonate rock) at high temperature to decompose the calcium carbonate to carbon dioxide (CO2) and calcium oxide (lime), slaking the resulting lime (calcium oxide) by addition of water to form a lime suspension (calcium hydroxide), and then performing carbonation of the resulting lime suspension. The carbonation may be done by treatment with CO2 gas whereby calcium carbonate is precipitated.

The pulp and paper industry produces a huge amount of ash per year. Dumping in landfills has long been a common method for the disposal of ash. However, environmental regulations and disposal cost have created a demand for new, more environmental friendly methods to re-use or handle the ash.

Fly ash is one of the residues generated in combustion of waste or biomasses generated in the production of pulp and paper/paperboard. Fly ash comprises the fine particles that rises with the flue gases and comprises, e.g. silicon dioxide and calcium oxide.

Prior attempts of using fly ash in the production of inorganic fillers or pigments have not been successful due to a high amount of harmful elements, such as heavy metals, e.g. As, Cd, Pb and Zn, in the ash. This has, besides the negative impact on the environment, caused problems with e.g. uneven quality, low brightness, and unprofitable production of the fillers. Thus, there remains a need for a method that enables the use of fly ash in the manufacturing of inorganic fillers or pigments.

SUMMARY

One object of the present invention is to reduce the problem with harmful elements, such as arsenic and heavy metals, when using fly ash as a raw material in the production of precipitated calcium carbonate.

The invention is defined by the appended independent claims. Embodiments are set forth in the appended dependent claims and in the following description and drawings.

The invention provides a method of producing a filler comprising calcium carbonate (PCC), preferably to be used in paper or paper board production or in composites. The method of the invention comprises the steps of;
   providing fly ash generated in paper or paper board production;
   fractionating said fly ash in at least one step, whereby a coarser fraction is separated from a finer fraction;
   forming a suspension of said coarser fraction;
   adding carbon dioxide to said suspension to form precipitated calcium carbonate.

The method of the invention avoids problems with high amounts of arsenic and heavy metals in the production of filler comprising PCC, when using ash generated in paper or paper board production as a raw material. It has been shown that harmful elements, such as arsenic and heavy metals, are primarily accumulated in the finer fractions of the fly ash. Thus, by using the coarser fraction in the step of carbonation, the amount of arsenic and heavy metals in the final product is reduced. It has been found that, by using the method of the invention, the amount of arsenic and harmful heavy metals in the formed filler can be reduced by at least 20-60%. In this way, a filler of higher quality, comprising less harmful elements and exhibiting a remarkably higher brightness, can be produced.

Said coarser fraction is slaked or dispersed in water to form a suspension, whereby the calcium oxide present in the ash form calcium hydroxide. At the addition of carbon dioxide, calcium hydroxide reacts with carbon dioxide ("carbonation") and forms calcium carbonate.

In the context of the invention, the term "filler" is meant to include both filler and/or pigment materials preferably to be used in the production of paper, paperboard or composites, e.g. fibre based composites.

The coarser fraction, separated in the fractionating step, may have an average particle size greater than 50 μm, and the finer fraction may have an average particle size of 50 μm and/or less. In a preferred embodiment, the coarser fraction may have an average particle size greater than 35 μm, and the finer fraction an average particle size of less than or equal to 35 μm. Alternatively, the coarser fraction may have an average particle size greater than 70 μm or 100 μm and the finer fraction equal or less than 70 μm or 100 μm.

Said coarser fraction is preferably grinded, most preferably to an average particle size of 20 μm or less, or even to an average particle size of 10 μm or less, prior to the step of forming a suspension. When the fraction is grinded to a particle size of e.g. 20 μm or less, the carbonation reaction is easier to control and the quality of the formed PCC is enhanced. Moreover, smaller ash particles generate smaller PCC particles in the end product, which enhances the dispersion properties of the produced filler and facilitates the mixing of the filler material in pulp. Also the sizes of other valuable mineral oxides that might be present in the ash, such as $Al_2O_3$, $SiO_2$ and/or $TiO_2$, are optimized by a grinding step.

Said coarser, and optionally grinded, fraction is preferably subjected to magnetic separation to remove magnetic material, such as iron, cupper and/or arsenic, prior to the carbonation step. The separation of such material prior to the carbonation step improves the brightness of the formed PCC. The grinding of the coarser fraction prior to the magnetic separation step liberates the impurities and increases the surface area whereby the removal is enhanced.

The magnetic separation may, e.g. be accomplished by use of a high gradient magnetic separator (HGMS).

The fly ash may be derived from incineration of waste materials. The waste materials may be generated in paper or paperboard production, e.g. by incineration of de-inking sludge from the recycled paper process, broke from the paper or paperboard production or fine materials from the white water.

Fly ash originating from paper or paper board production comprises a high amount of calcium oxide, primarily derived from filler residues, and consequently there is no need to add any extra calcium hydroxide to the suspension before the step of carbonation. The fly ash used as raw-material in the method of the invention preferably comprises at least 10% by weight of calcium oxide, more preferably at least 30% by weight and even more preferably at least 50% by weight of calcium oxide, all percentages calculated on the total solid content of the ash. A high amount of calcium oxide generates a high amount of PCC in the final filler product. The fly ash may advantageously further comprise $Al_2O_3$, $SiO_2$ and/or $TiO_2$. These oxides also form valuable filler components. Moreover, these oxides may form complexes with, or bind to, unreacted or re-dissolved calcium ions, present in the suspension or filler. Dissolved calcium ions present in the filler may react with fatty acids in pulp furnish, which may have negative impact on the runability. Thus, the filler produced by the method of the invention preferably comprises a high amount of PCC (e.g. from about 50% to about 90%), but it may also comprise $Al_2O_3$, $SiO_2$ and/or $TiO_2$ and/or reaction products of any of these.

The method of the invention is most efficient when the fly ash used is derived from incineration of waste materials generated in the paper or paper board production, and especially when the waste materials comprises deinking sludge and/or recycling wood chips, since such ash comprises a substantial amount of heavy metals According to one embodiment of the method, extra calcium oxide or calcium carbonate is added to the waste materials prior to or during the incineration of the waste materials. In this way, the calcium content in the ash is increased whereby the quality of the formed PCC is improved.

Paper chemicals commonly used in the wet end, e.g. Micro or nanofibrillated cellulose, starch, sodium carboxymethyl cellulose, C-PAM, APAM, sodium polyacrylic acid (PAA), and/or bentonite, may be added to the suspension of the coarser fraction prior to the addition of carbon dioxide. In one embodiment, anionic and/or cationic dispersion and or wetting agents, such as anionic-cationic, non-ionic or amphoteric tensides, anionic or cationic, non-ionic or amphiphilic polymers, anionic or cationic CMC, A-PAM and/or anionic starch, sodium polyacrylates, polyphosphates, are added to the suspension. Such agents control the wettability and the charge of the particles and stabilize the dispersion.

In one embodiment, the suspension further comprises cellulose fibers, which are present during the addition of carbon dioxide. In this way, the formed PCC is directly precipitated onto the fibers, which reduces the amount of retention chemicals needed. This can be achieved off- at- or in-line in a continuous or batch process. Preferably, precipitation onto the fibers is accomplished by adding the coarser, preferably grinded, fraction of the fly ash to the paper making stock and then add (e.g. by injection) carbon dioxide to a flow of said stock, e.g. in the short circulation of the paper making machine. Alternatively, cellulose fibers may be firstly mixed with the coarser fraction of the fly ash whereupon the mixture of fibers and fly ash is grinded followed by precipitation of calcium carbonate. In this way, small homogenous ash particles and fibre fragments are formed which facilitate the precipitation of calcium carbonate on the fibers even further.

The present invention further relates to a method of producing paper or paperboard, comprising the steps of;
providing a furnish comprising cellulose fibers,
adding filler made by the method described above to the furnish,
forming a paper or paperboard web of said furnish,
drying said web to form paper or paperboard Said method makes it possible to use PCC made from fly ash as filler in paper or paperboard and avoids problems with harmful elements, such as arsenic and heavy metals, related to prior art processes.

The invention further relates to a method of producing paper or paperboard, comprising the steps of;
providing fly ash generated in paper or paper board production;
fractionating said fly ash in at least one step, whereby a coarser fraction is separated from a finer fraction;
adding said coarser fraction to a furnish comprising cellulose fibers
adding carbon dioxide to said furnish to form precipitated calcium carbonate
forming a paper or paper board web of said furnish
drying said web to form paper or paper board.

Thus, the filler may be produced in-line in the paper or paperboard production, e.g. by adding the coarser, preferably grinded, fraction of the fly ash to the paper making furnish.

The filler produced in accordance with the invention may further be used in composites, preferably fiber-based composites, or as an additive in plastic production.

The invention further relates a method to form a composite comprising the steps of;
forming a furnish comprising cellulose fibers and polymers, such as polyethylene, polybutadiene or polypropylene.
adding the precipitated calcium carbonate made by the method described above, and
drying said composite The invention further relates to paper or paperboard comprising a precipitated calcium carbonate made by the method as filler.

The invention further relates to a composite comprising cellulose fibers, polymers (e.g. polyethylene, polybutadiene and/or polypropylene) and a precipitated calcium carbonate made by the method.

DETAILED DESCRIPTION

The invention will be described further with reference to the accompanying schematic drawing, wherein:

FIG. 1 shows a schematic illustration of a process in accordance with the invention.

In a first step (1), fly ash generated in paper or paperboard production is provided. The fly ash may, e.g. be generated by incineration of deinking sludge. In a second step (2), said fly ash is fractionated into at least two fractions (2a, 2b), one of which is relatively coarse (2a) and the other relatively fine (2b). Said relatively coarse fraction (2a) contains ash particles from about 50 μm to about 100 μm width and/or thickness and said relatively fine fraction (2b) contains particles from less than about 50 μm. The fractionation may be accomplished by use of cyclones and/or by use of screens of predetermined mesh sizes. The relatively fine fraction (2b) is further treated as waste material, whiles the coarse fraction (2a), most advantageously, is grinded in a step (3) to form particles from less than 10 μm width and/or thickness. Preferably, the coarse fraction is grinded in dry state, since this gives better control of the particle sizes. However, the wet grinding could also be used. The grinded ash particles (3a) are thereafter dispersed in hot water to form a suspension in a fourth step (4). The ash particles comprise calcium oxide, which form calcium hydroxide in the suspension. Additives, such as dispersion agents and/or wetting agents, may be added to said suspension. Thereafter, carbon dioxide (5) is added to the suspension. Preferably, a gas stream containing carbon dioxide (5) is bubbled directly into the suspension, whereby the carbon dioxide reacts with calcium hydroxide present in the suspension and PCC is formed.

The therby produced precipitated calcium carbonate may be filtered, added to a pulp furnish in a pulp chest prior to being supplied to the head box of a paper machine. The furnish is thereafter applied to a wire and subsequently formed and dewatered in conventional manners to form paper or paperboard.

EXAMPLE 1

Fly ash from incineration of deinking sludge and recovered wood (energy ratio 25/75%) was collected for further treatment in accordance with this example. The incineration was performed in a Bubbling Fluidized Bed (BFB) boiler, with a bed temperature of 750-850° C. and a gas temperature before superheating of 950-1000° C.

Said ash was fractionated and thereafter grinded in a ball mill system. The ash was fed to a cyclone/classifier wherein the air flow, regulated by rotation speed of the fan, was used to separate a fine fraction from a coarse fraction. In a first classifier test, the rotation speed was chosen to separate a fraction with an average particles size of less than 50 μm (fine fraction) from a coarse fraction. In this way, 35% of the fly ash was separated as fine fraction, and 65% as coarse fraction. In a second classifier test, the rotation speed was chosen to separate a fraction with an average particle size of less than 35 μm from a coarse fraction. In this way, 30% of the fly ash was separated as fine fraction. The coarser fractions were thereafter grinded in the ball mill to average particle sizes of less than 10 μm. A small amount of an anti-agglomeration additive was added to the ash in the grinding step.

The ash was analyzed with regard to the mineral contents such as silicate and oxide minerals, and harmful metals, as shown in table 1 and table 2.

As can be seen in table 1, the calcium oxide content was higher than 50% in all fractions. As can be seen in table 2, the amount of harmful elements, such as arsenic, cadmium and lead, were remarkably reduced in both the first and second classifier tests.

Thereafter, the coarse fractions were dispersed in hot water to form a suspension of about 25-30%. Carbon dioxide was bubbled to the suspension whereby precipitated calcium carbonate was formed. The process was controlled by pH measurements, which optimally cannot decrease below 8.3-8.5.

The PCC achieved by said process is of high quality, it comprises a low content of harmful elements and show a high brightness.

TABLE 1

| ELEMENTS | unit | Original ash | First classifier test-fine material | First classifier test-grinded coarse material | Second classifier test-fine material | Second classifier test-grinded coarse material |
|---|---|---|---|---|---|---|
| Dry Solid Content (DS) | % | 100 | 100 | 100 | 100 | 100 |
| GR | % of DS | | 99.2 | 98.6 | | |
| SiO2 | % DS | 18.5 | 19 | 20.1 | 17 | 19 |
| Al2O3 | % DS | 8.54 | 8.88 | 8.45 | 8.09 | 8.62 |
| CaO | % DS | 57.2 | 53.6 | 56.5 | 55.1 | 59.8 |
| Fe2O3 | % DS | 0.882 | 1.65 | 0.881 | 0.78 | 0.78 |
| K2O | % DS | 0.537 | 0.699 | 0.402 | 0.541 | 0.348 |
| MgO | % DS | 3.23 | 3.21 | 3.31 | 3.4 | 3.17 |
| MnO | % DS | 0.0693 | 0.0798 | 0.0585 | 0.0797 | 0.0551 |
| Na2O | % DS | 0.51 | 0.486 | 0.399 | 0.516 | 0.403 |
| P2O5 | % DS | 0.169 | 0.176 | 0.141 | 0.175 | 0.143 |
| TiO2 | % DS | 0.491 | 0.522 | 0.473 | 0.45 | 0.433 |
| Total Sum | % DS | 90.1 | 88.3 | 90.7 | 86.1 | 92.8 |
| LOI 1000° C. | % DS | 7.2 | 3.7 | 3 | 6.5 | 6.3 |

TABLE 2

| ELEMENTS | unit | Original ash | First classifier test-fine material | First classifier test-grinded coarse material | Reduction of heavy metals in coarse material first classifier test, % | Second classifier test-fine material | Second classifier test-grinded coarse material | Reduction of heavy metals in coarse material second classifier test, % |
|---|---|---|---|---|---|---|---|---|
| As | mg/kg DS | 67.9 | 84.8 | 37.2 | 45.2 | 111 | 44.2 | 34.9 |
| Ba | mg/kg DS | 520 | 628 | 438 | 15.8 | 623 | 452 | 13.1 |

TABLE 2-continued

| ELEMENTS | unit | Original ash | First classifier test-fine material | First classifier test-grinded coarse material | Reduction of heavy metals in coarse material first classifier test, % | Second classifier test-fine material | Second classifier test-grinded coarse material | Reduction of heavy metals in coarse material second classifier test, % |
|---|---|---|---|---|---|---|---|---|
| Be | mg/kg DS | 0.983 | 1.03 | 1.08 | −9.9 | 1.18 | 0.642 | 34.7 |
| Cd | mg/kg DS | 2.82 | 3.49 | 1.29 | 54.3 | 4.01 | 1.3 | 53.9 |
| Co | mg/kg DS | 7.7 | 9.08 | 5.95 | 22.7 | 8.92 | 6.48 | 15.8 |
| Cr | mg/kg DS | 148 | 189 | 104 | 29.7 | 189 | 99.2 | 33.0 |
| Cu | mg/kg DS | 595 | 752 | 407 | 31.6 | 815 | 402 | 32.4 |
| Hg | mg/kg DS | 0.186 | 0.2 | 0.0409 | 78.0 | 0.288 | 0.0204 | 89.0 |
| Mo | mg/kg DS | 4.92 | 5.39 | 3.26 | 33.7 | 4.76 | 3.3 | 32.9 |
| Nb | mg/kg DS | 6.29 | 6.33 | 6.27 | 0.3 | 5.17 | 6.13 | 2.5 |
| Ni | mg/kg DS | 59 | 60.5 | 51.8 | 12.2 | 63.1 | 54.2 | 8.1 |
| Pb | mg/kg DS | 287 | 343 | 126 | 56.1 | 346 | 112 | 61.0 |
| S | mg/kg DS | 4620 | 6150 | 2270 | 50.9 | 7060 | 2430 | 47.4 |
| Sc | mg/kg DS | 2.78 | 2.1 | 2.04 | 26.6 | 2.54 | 2.49 | 10.4 |
| Sn | mg/kg DS | 9.99 | 10.6 | 7.25 | 27.4 | 12.1 | 7.64 | 23.5 |
| Sr | mg/kg DS | 796 | 811 | 844 | −6.0 | 825 | 778 | 2.3 |
| V | mg/kg DS | 19.4 | 28.5 | 18.4 | 5.2 | 18.8 | 16.4 | 15.5 |
| Y | mg/kg DS | 9.54 | 11.3 | 9.74 | −2.1 | 8.92 | 8.96 | 6.1 |
| Zn | mg/kg DS | 1550 | 2370 | 906 | 41.5 | 2560 | 774 | 50.1 |
| Zr | mg/kg DS | 122 | 101 | 98.8 | 19.0 | 114 | 118 | 3.3 |

EXAMPLE 2

A second trial was performed to study the effect of magnetic separation on the brightness of the formed PCC. In this trial, fractionated and grinded fly ash was slaked at 90° C. for 5 hours followed by precipitation at 20° C. with $CO_2$ feed 0.5 l/min, 2 wt % ash. After precipitation, the material was filtered and dried.

A reference sample (Ref Sample), produced in accordance with the above described process, was compared with a sample (Sample 1), also produced in accordance with the above described process but with the additional step of magnetic separation of magnetic materials prior to the step of precipitation. The magnetic separation was performed using a magnetic field of 3T. The brightness (D65) of the ref. Sample and Sample 1 is shown in table 3 below. As can be seen in the table, the brightness of the PCC produced in a method including magnetic separation prior to precipitation was considerable higher than the reference.

TABLE 3

| Sample | Brightness (D65) [%] |
|---|---|
| Ref. Sample | 67.0 |
| Sample 1 | 73.7 |

The invention claimed is:

1. A method of producing filler, comprising precipitated calcium carbonate (PCC), said method comprising the steps of,
    providing fly ash generated in paper or paper board production, the fly ash comprising calcium oxide;
    fractionating said fly ash in at least one step, whereby a first fraction is separated from a second fraction, the first fraction comprising particles that are coarser compared with particles in the second fraction wherein the first fraction has an average particle size greater than 50 μm and less than 100 μm, and the second fraction has an average particle size of 50 μm or less;
    grinding said first fraction prior to the step of forming a suspension, wherein said first fraction is ground to exhibit an average particle size of between 10 to 20 μm;
    forming the suspension of only the grounded first fraction having the average particle size of between 10 to 20 μm, wherein the calcium oxide of the fly ash forms calcium hydroxide, wherein the suspension of the grounded first fraction further comprise a furnish that includes cellulose fibers; and,
    adding carbon dioxide to said suspension of grounded first fraction comprising the furnish to form precipitated calcium carbonate in the presence of the cellulose fibers.

2. The method according to claim 1, wherein the fly ash includes magnetic material that is removed from said first fraction by magnetic separation.

3. The method according to claim 1, wherein the fly ash is derived from incineration of waste materials generated in paper or paper board production.

4. The method according to claim 1, wherein the fly ash comprises at least 10% by weight of calcium oxide, said percentage calculated on the total solid content of the fly ash.

5. The method according to claim 1, wherein the fly ash further comprises $Al_2O_3$, $SiO_2$ and/or $TiO_2$.

6. The method according to claim 3, wherein extra calcium carbonate or calcium oxide is added prior to or during the incineration of the waste materials.

7. The method according to claim 1, wherein dispersion agents are added to the suspension of the first fraction prior to the addition of carbon dioxide.

8. The method of claim 1, wherein the fly ash contains at least 30% by weight of calcium oxide, calculated on the total solids content of the fly ash.

* * * * *